(12) United States Patent
Park et al.

(10) Patent No.: US 8,548,000 B2
(45) Date of Patent: Oct. 1, 2013

(54) DUAL TRANSMISSION STREAM GENERATING DEVICE AND METHOD

(75) Inventors: Eui-Jun Park, Seoul (KR); Yong-sik Kwon, Seoul (KR); Jung-pil Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1228 days.

(21) Appl. No.: 11/505,894

(22) Filed: Aug. 18, 2006

(65) Prior Publication Data

US 2007/0230560 A1   Oct. 4, 2007

Related U.S. Application Data

(60) Provisional application No. 60/788,707, filed on Apr. 4, 2006.

(30) Foreign Application Priority Data

Jul. 19, 2006   (KR) .................. 10-2006-0067662

(51) Int. Cl.
*H04J 3/24* (2006.01)

(52) U.S. Cl.
USPC ........................................... 370/473

(58) Field of Classification Search
USPC .......................... 370/473, 474, 475
See application file for complete search history.

(56) References Cited

U.S. PATENT DOCUMENTS

| | | | |
|---|---|---|---|
| 6,760,077 B2 | 7/2004 | Choi et al. | |
| 7,111,221 B2 * | 9/2006 | Birru et al. | 714/755 |
| 7,116,894 B1 * | 10/2006 | Chatterton | 386/211 |
| 7,194,047 B2 * | 3/2007 | Strolle et al. | 375/341 |
| 2001/0055342 A1 * | 12/2001 | Fimoff | 375/240.26 |
| 2002/0194570 A1 | 12/2002 | Birru et al. | |
| 2003/0079173 A1 * | 4/2003 | Birru | 714/792 |
| 2003/0099303 A1 | 5/2003 | Birru et al. | |
| 2004/0057535 A1 * | 3/2004 | Strolle et al. | 375/340 |
| 2005/0249301 A1 | 11/2005 | Jeong et al. | |

FOREIGN PATENT DOCUMENTS

CN   1209885 C   7/2005

OTHER PUBLICATIONS

U.S. Appl. No. 11/416,254, filed May 3, 2006, Jung-pil Yu et al., Samsung Electronics Co., Ltd.
U.S. Appl. No. 11/416,258, filed May 3, 2006, Yong-sik Kwon et al., Samsung Electronics Co., Ltd.
U.S. Appl. No. 11/416,457, filed May 3, 2006, Jung-pil Yu et al., Samsung Electronics Co., Ltd.
U.S. Appl. No. 11/503,970, filed Aug. 15, 2006, Jung-pil Yu et al., Samsung Electronics Co., Ltd.
U.S. Appl. No. 11/504,024, filed Aug. 15, 2006, Jung-pil Yu et al., Samsung Electronics Co., Ltd.

(Continued)

*Primary Examiner* — Mark Rinehart
*Assistant Examiner* — Mohammad Anwar
(74) *Attorney, Agent, or Firm* — Sughrue Mion, PLLC

(57) ABSTRACT

A dual transmission stream generating device includes a turbo pre-processor that receives a turbo stream, encodes the turbo stream to obtain an encoded turbo stream, and expands the encoded turbo stream to obtain an expanded turbo stream; and a turbo packet stuffer that receives a normal stream and the expanded turbo stream, segments the expanded turbo stream into fragments having a specified size, and generates a dual transmission stream by stuffing the fragments of the encoded turbo stream into a specified area of the normal stream.

41 Claims, 12 Drawing Sheets

(56) References Cited

OTHER PUBLICATIONS

U.S. Appl. No. 11/504,027, filed Aug. 15, 2006, Jung-pil Yu et al., Samsung Electronics Co., Ltd.
U.S. Appl. No. 11/504,029, filed Aug. 15, 2006, Jung-pil Yu et al., Samsung Electronics Co., Ltd.
U.S. Appl. No. 11/504,030, filed Aug. 15, 2006, Jung-pil Yu et al., Samsung Electronics Co., Ltd.
U.S. Appl. No. 11/504,031, filed Aug. 15, 2006, Jung-pil Yu et al., Samsung Electronics Co., Ltd.
U.S. Appl. No. 11/504,038, filed Aug. 15, 2006, Jung-pil Yu et al., Samsung Electronics Co., Ltd.
U.S. Appl. No. 11/504,651, filed Aug. 16, 2006, Jung-pil Yu et al., Samsung Electronics Co., Ltd.
U.S. Appl. No. 11/504,724, filed Aug. 16, 2006, Jung-pil Yu et al., Samsung Electronics Co., Ltd.
U.S. Appl. No. 11/504,725, filed Aug. 16, 2006, Jung-pil Yu et al., Samsung Electronics Co., Ltd.
U.S. Appl. No. 11/504,726, filed Aug. 16, 2006, Jung-pil Yu et al., Samsung Electronics Co., Ltd.
U.S. Appl. No. 11/505,369, filed Aug. 17, 2006, Jung-pil Yu et al., Samsung Electronics Co., Ltd.
U.S. Appl. No. 11/508,144, filed Aug. 23, 2006, Jung-pil Yu et al., Samsung Electronics Co., Ltd.
U.S. Appl. No. 11/523,716, filed Sep. 20, 2006, Jung-pil Yu et al., Samsung Electronics Co., Ltd.
U.S. Appl. No. 11/692,509, filed Mar. 28, 2007, Hae-joo Jeong et al., Samsung Electronics Co., Ltd.
International Search Report issued on Jun. 21, 2007, in International Application No. PCT/KR2007/001562.
Written Opinion of the International Searching Authority issued on Jun. 21, 2007, in International Application No. PCT/KR2007/001562.
Communication dated Feb. 4, 2013 from the State Intellectual Property Office of P.R. China in a counterpart application No. 200910170700.4.
Communication from the Canadian Patent Office dated Mar. 13, 2013, in a counterpart application No. 2645612.
Communication issued on Jan. 10, 2012 by the European Patent Office in the counterpart European Patent Application No. 07745725.7.
Communication issued on Dec. 28, 2011 by the European Patent Office in the counterpart European Patent Application No. 07745725.7.
"ATSC Standard: Digital Television Standard (A/53), Revision D, Including Amendment No. 1", Advanced Television Systems Committee, Jul. 19, 2005, pp. 1-104.

\* cited by examiner

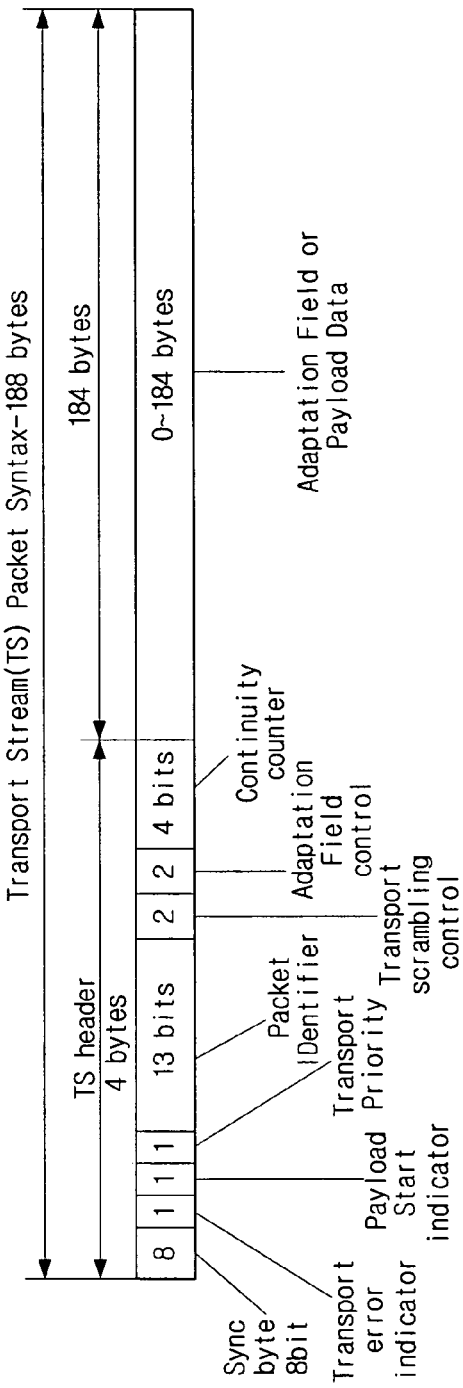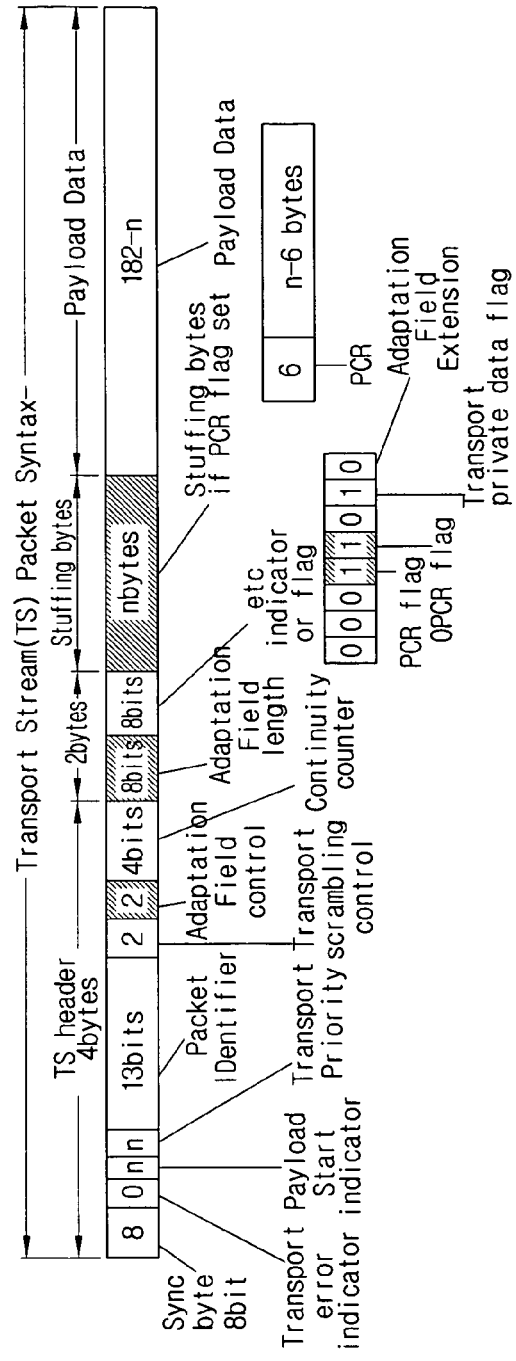

DUAL TRANSMISSION STREAM GENERATING DEVICE AND METHOD

CROSS-REFERENCE TO RELATED APPLICATIONS

This application claims the benefit of U.S. Provisional Patent Application No. 60/788,707 filed on Apr. 4, 2006, in the United States Patent and Trademark Office, and Korean Patent Application No. 2006-67662 filed on Jul. 19, 2006, in the Korean Intellectual Property Office. The disclosures of these two priority applications are incorporated herein by reference in their entirety.

BACKGROUND OF THE INVENTION

1. Field of the Invention

An aspect of the invention generally relates to a dual transmission stream generating device and a method of generating a dual transmission stream including a normal stream and a turbo stream for digital broadcasting. More particularly, an aspect of the invention relates to a dual transmission stream generating device and a method of generating a dual transmission stream including a normal stream and a robustly-processed turbo stream to enhance the reception performance in an Advanced Television Systems Committee (ATSC) Vestigial Sideband (VSB) Digital Television (DTV) system that is an American-type digital terrestrial broadcasting system.

2. Description of the Related Art

The ATSC VSB DTV system that is an American-type digital terrestrial broadcasting system is a single-carrier system and provides one field sync signal for each unit of 312 data segments. Accordingly, this system exhibits poor reception performance over an inferior channel, particularly over a Doppler fading channel.

FIG. 1 is a block diagram of an example of a transmitter and a receiver of an American-type digital terrestrial broadcasting system complying with an ATSC Enhanced VSB (EVSB) DTV standard that has been proposed by Philips Electronics. This system generates and transmits a dual transmission stream by adding a robust stream to a normal stream of the conventional ATSC VSB DTV system. A robust stream is a stream that has been subjected to a robust data process to provide improved reception performance compared to a normal stream over an inferior channel, particularly over a Doppler fading channel.

As shown in FIG. 1, the digital broadcasting transmitter includes a randomizer 110 randomizing a dual transmission stream, a Reed-Solomon (RS) encoder 120 in the form of a concatenated encoder adding parity bytes to the dual transmission stream to correct errors occurring due to channel characteristics during transmission, an interleaver 130 interleaving the RS-encoded data according to a specified interleaving pattern, and a 2/3 rate trellis encoder 140 mapping the interleaved data into 8-level data symbols by performing a 2/3-rate trellis encoding of the interleaved data. The dual transmission stream received by the randomizer 110 is an MPEG-2 transmission stream, and thus the digital broadcasting transmitter of FIG. 1 performs an error correction encoding of the MPEG-2 transmission stream. The digital broadcasting transmitter of FIG. 1 is an 8-VSB system because the trellis encoder 140 maps the interleaved data into 8-level data symbols.

The digital broadcasting transmitter further includes a multiplexer (MUX) 150 multiplexing a field sync signal and a segment sync signal with the data symbols from the trellis encoder 140 to obtain an ATSC VSB DTV data frame having the configuration shown in FIG. 2, and a VSB modulator 160 inserting a pilot into the data symbols that have been multiplexed with the field sync signal and the segment sync signal by adding a specified DC value to the data symbols, performing a VSB modulation of the data symbols by pulse-shaping the data symbols to obtain a VSB-modulated signal, and up-converting the VSB-modulated signal to an RF channel band signal which is then transmitted over a channel.

Accordingly, in the digital broadcasting transmitter of FIG. 1, a multiplexer (not shown) multiplexes the normal stream and the robust stream to obtain a dual transmission stream to be transmitted over one channel, and inputs the dual transmission stream to the randomizer 110. The input data is randomized by the randomizer 110, the randomized data is outer-encoded by the RS encoder 120 serving as an outer encoder, and the outer-encoded data is interleaved by the interleaver 130 according to a specified interleaving pattern. The interleaved data is inner-encoded in units of 12 symbols and mapped into 8-level data symbols by the trellis encoder 140. A field sync signal and a segment sync signal are multiplexed with the data symbols from the trellis encoder 140 by the multiplexer 150. A pilot is inserted in the data symbols that have been multiplexed with the field sync signal and the segment sync signal by the VSB modulator 160, the data symbols with the inserted pilot are VSB-modulated by the VSB modulator 160 to obtain a VSB-modulated signal, and the VSB-modulated signal is up-converted by an up-converter (not shown) to an RF signal channel which is then transmitted over the channel.

The digital broadcasting receiver of FIG. 1 includes a tuner (not shown) down-converting the RF channel band signal received through the channel to a baseband signal, a VSB demodulator 210 performing sync detection and demodulation on the baseband signal, an equalizer 220 compensating the demodulated signal for channel distortions such as multipath, a Viterbi decoder 230 correcting errors in the equalized signal to obtain data symbols and decoding the data symbols to obtain decoded data, a deinterleaver 240 deinterleaving the decoded data according to the specified interleaving pattern used by the interleaver 130 of the digital broadcasting transmitter, a RS decoder 250 correcting errors in the deinterleaved data, and a derandomizer 260 derandomizing the error-corrected data from the RS decoder 250 and outputting an MPEG-2 dual transmission stream.

Hence, the digital broadcasting receiver of FIG. 1 recovers the original signal inputted to the randomizer 110 of the digital broadcasting transmitter of FIG. 1 by reversing the operations performed by the digital broadcasting transmitter of FIG. 1 by down-converting the RF signal to the baseband signal, demodulating and equalizing the baseband signal, and performing a channel decoding operation on the baseband signal.

FIG. 2 shows an ATSC VSB DTV data frame having the field sync signal and the segment sync signal that is used in the American-type digital terrestrial broadcasting system. As shown in FIG. 2, one frame consists of two fields, and one field consists of one field sync segment as the first segment, and 312 data segments. In the ATSC VSB DTV data frame, one data segment corresponds to one MPEG-2 packet, and consists of a 4-symbol segment sync signal and 828 data symbols.

The segment sync signal and the field sync shown in FIG. 2 are used for synchronization and equalization in the VSB demodulator 210 and the equalizer 220 in the digital broadcasting receiver of FIG. 1. That is, the field sync signal and the segment sync signal are known data known to both the digital broadcasting transmitter and the digital broadcasting receiver of FIG. 1, which is used as a reference signal for the equalization performed by the equalizer 220 in the digital broadcasting receiver of FIG. 1.

As discussed above, the digital terrestrial broadcasting system of FIG. 1 generates and transmits a dual transmission stream by adding the robust stream to the normal stream of the conventional ATSC VSB DTV system so that the robust stream is transmitted together with the conventional normal stream.

However, the digital terrestrial broadcasting system of FIG. 1 cannot solve the poor reception performance of the conventional normal stream over a multipath channel even when the dual transmission stream with the robust stream is transmitted. That is, the reception performance for the normal stream is not improved at all even when the dual transmission stream is transmitted. In addition, the reception performance for the turbo stream over the multipath channel does not show any great improvement. Therefore, it would be desirable to increase the robustness of the robust data process used to process the robust stream to enhance the reception performance of the robust stream.

SUMMARY OF THE INVENTION

An aspect of the invention is to solve the above-mentioned and/or other problems and disadvantages by providing a dual transmission stream generating device and method that generates a dual transmission stream by inserting a turbo stream provided with a parity insertion area into a normal stream to enhance the reception performance of the ATSC VSB DTV system that is an American-type digital terrestrial broadcasting system.

According to an aspect of the invention, a dual transmission stream generating device includes a turbo pre-processor that receives a turbo stream, encodes the turbo stream to obtain an encoded turbo stream, and expands the encoded turbo stream to obtain an expanded turbo stream; and a turbo packet stuffer that receives a normal stream and the expanded turbo stream, segments the expanded turbo stream into fragments having a specified size, and generates a dual transmission stream by stuffing the fragments of the expanded turbo stream into a specified area of the normal stream.

The dual transmission stream generating device may further include a transmission adaptor that receives the normal stream, re-packetizes the normal stream to obtain a re-packetized normal stream including adaptation fields filled with stuff bytes in the specified area of the normal stream, and outputs the re-packetized normal stream to the turbo packet stuffer; wherein the turbo packet stuffer receives the re-packetized normal stream as the normal stream, and generates the dual transmission stream by stuffing the fragments of the expanded turbo stream into the stuff bytes of the adaptation fields of the re-packetized normal stream.

The normal stream and the dual transmission stream may each include a plurality of fields; the expanded turbo stream may include a plurality of turbo packets; and the turbo packet stuffer may segment each of the turbo packets into a plurality of turbo packet fragments having the specified size, and generate the dual transmission stream by stuffing the turbo packet fragments into the specified area of the normal stream field by field so that a first turbo packet fragment in each of the fields of the dual transmission stream is always a first turbo packet fragment of a new one of the turbo packets.

The specified area of the normal stream may include a plurality of stuff byte areas of the normal stream, and a length of each of the fragments of the expanded turbo stream may be equal to a length of each of the stuff byte areas.

The dual transmission stream may include a plurality of fields each including a plurality of packets, and the turbo packet stuffer may stuff the fragments of the expanded turbo stream into ones of the packets appearing at preset intervals in each of the fields.

The turbo pre-processor may include a Reed-Solomon encoder that receives the turbo stream, encodes the turbo stream using a Reed-Solomon encoding process to obtain parity data, and appends the parity data to the turbo stream to obtain the encoded turbo stream; and a placeholder maker that receives the encoded turbo stream, and inserts a parity insertion area into the encoded turbo stream to obtain the expanded turbo stream.

The encoded turbo stream and the expanded turbo stream may each include a plurality of bytes; and the placeholder maker may perform a 1/2 rate conversion of the encoded turbo stream by converting each of the bytes of the encoded turbo stream into 2 bytes of the expanded data stream.

The encoded turbo stream and the expanded turbo stream may each include a plurality of bytes; and the placeholder maker may perform a 1/4 rate conversion of the encoded turbo stream by converting each of the bytes of the encoded turbo stream into 2 bytes of the expanded data stream.

According to another aspect of the invention, a dual transmission stream generating method includes receiving a turbo stream; encoding the turbo stream to obtain an expanded turbo stream; expanding the encoded turbo stream to obtain an expanded turbo stream; receiving a normal stream; segmenting the expanded turbo stream into fragments having a specified size; and generating a dual transmission stream by stuffing the fragments of the expanded turbo stream into a specified area of the normal stream.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of embodiments of the invention, taken in conjunction with the accompanying drawings of which:

FIG. 5A is a diagram of an example of a conventional MPEG-2 transmission stream;

FIG. 5B is a diagram of an example of an MPEG-2 transmission stream including an adaptation field according to an aspect of the invention;

DETAILED DESCRIPTION OF THE EMBODIMENTS

Figure 1:
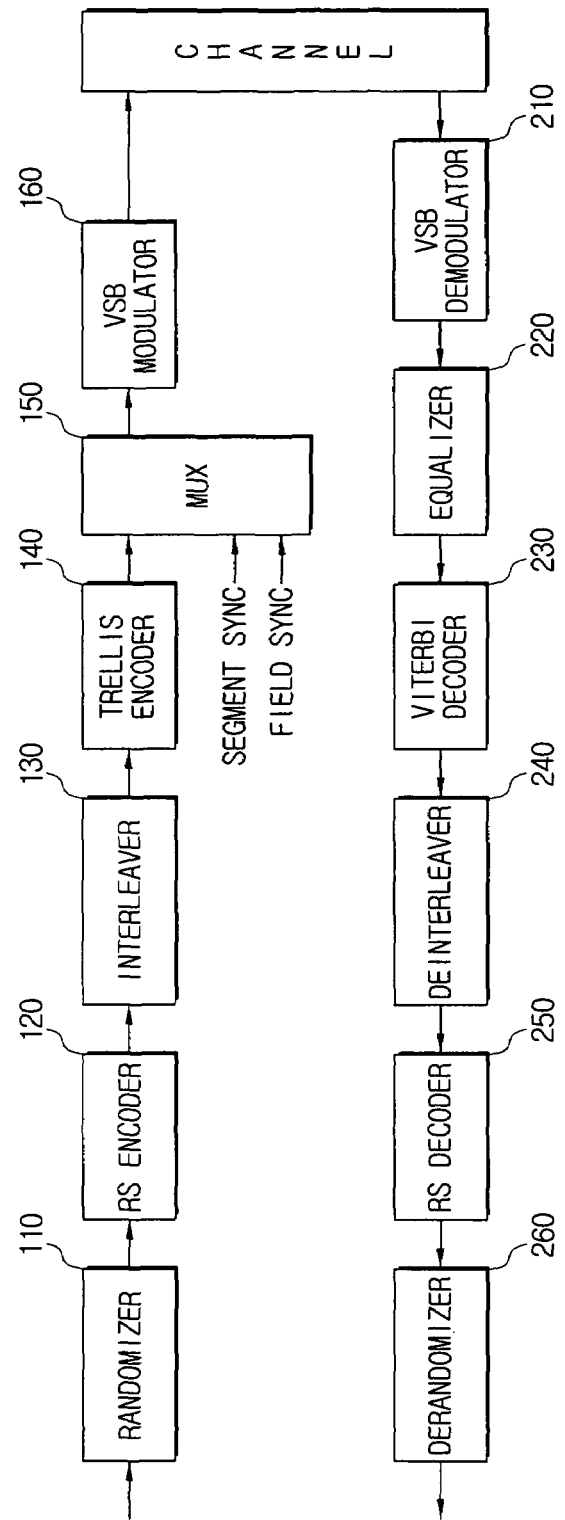
FIG. 1 is a block diagram of an example of a conventional ATSC VSB DTV digital broadcasting system including a digital broadcasting transmitter and a digital broadcasting receiver.

Reference will now be made in detail to embodiments of the invention, examples of which are shown in the accompanying drawings, wherein like reference numerals refer to like elements throughout. The embodiments are described below in order to explain the invention by referring to the figures.

Figure 3:
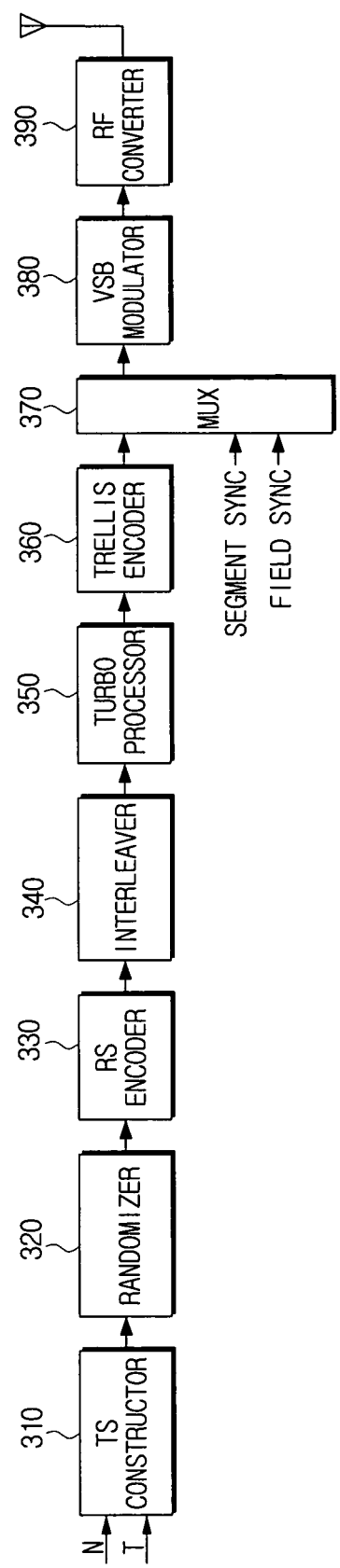
FIG. 3 is a block diagram of an example of a digital broadcasting transmitter including a dual transmission stream generating device according to an aspect of the invention.

FIG. 3 is a block diagram of an example of a digital broadcasting transmitter including a dual transmission stream generating device according to an aspect of the invention. Referring to FIG. 3, the digital broadcasting transmitter includes a transmission stream (TS) constructor 310, a randomizer 320, a Reed-Solomon (RS) encoder 330, a interleaver 340, a turbo processor 350, a trellis encoder 360, a multiplexer (MUX) 370, a VSB modulator 380, and an RF converter 390.

The TS constructor 310, which is an example of a dual transmission stream generating device according to an aspect of the invention, receives a normal stream N and a turbo stream T and generates a dual TS by multiplexing the normal stream and the turbo stream. The normal stream and the turbo stream can be received from an external module such as a broadcasting camera, or various internal modules such as a compression processing module (e.g., an MPEG-2 module), a video encoder, and an audio encoder. The TS constructor 310 will be explained below in greater detail.

The randomizer 320 randomizes the dual TS output from the TS constructor 310 to make more effective use of an allocated channel space.

The RS encoder 330 appends parity bytes to the randomized dual TS by performing an RS-encoding operation to enable correction of errors occurring due to variations and disturbances in a channel.

The interleaver 340 interleaves the encoded dual TS according to a specified interleaving pattern.

The turbo processor 350 performs a turbo processing on the turbo stream of the interleaved dual TS, and corrects errors in the parity bytes appended to the turbo stream by the RS encoder 330 caused by the turbo processing. The turbo processing is a robust data process using a turbo encoding process to provide improved reception performance for the turbo stream compared to the normal stream over an inferior channel, particularly over a Doppler fading channel.

The trellis encoder 360 trellis-encodes the turbo-processed dual TS.

Figure 2:
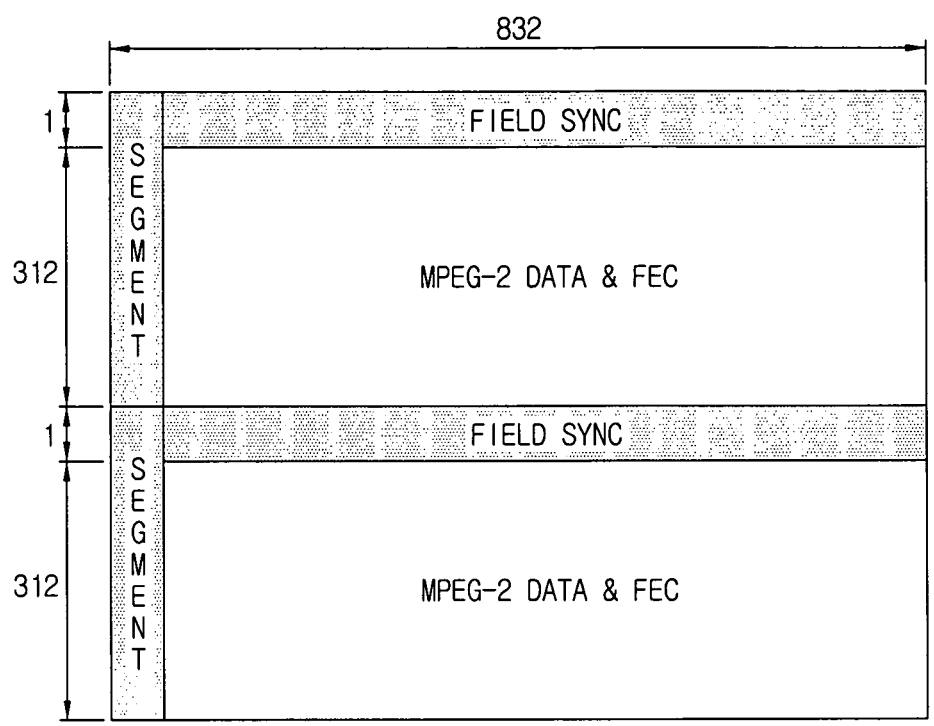
FIG. 2 is a diagram of a conventional ATSC VSB DTV data frame.

The multiplexer 370 multiplexes data symbols of the trellis-encoded dual TS with a field sync signal and a segment sync signal to produce an Advanced Vestigial Sideband (AVSB) DTV data frame according to an aspect of the invention having the same configuration as the ATSC VSB DTV data frame shown in FIG. 2 except that the contents of the data segments in the AVSB DTV data frame according to an aspect of the invention are different from the contents of the data segments in the ATSC VSB DTV data frame shown in FIG. 2.

The VSB modulator 380 inserts a pilot into the data symbols multiplexed with the field sync signal and the segment sync signal by adding a specified DC value to the data symbols, and performs VSB modulation of the data symbols by pulse-shaping the data symbols.

The RF converter 390 up-converts the VSB-modulated dual TS into an RF channel band signal which is then transmitted over the channel.

Figure 4:
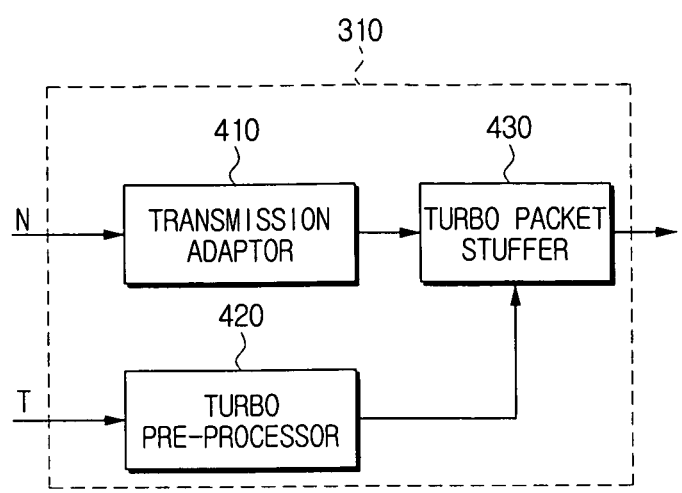
FIG. 4 is a block diagram of an example of a dual transmission stream generating device according to an aspect of the invention which is the TS constructor 310 of FIG. 3.

FIG. 4 is a block diagram of an example of a dual transmission stream generating device according to an aspect of the invention which is the TS constructor of FIG. 3. Referring to FIG. 4, the TS constructor (i.e., the dual transmission stream generating device) 310 includes a transmission adaptor 410, a turbo pre-processor 420, and a turbo packet stuffer 430. The transmission adaptor 410 extracts all elementary streams from the normal TS input to the TS constructor 310 and re-packetizes the normal TS to include adaptation fields filled with stuff bytes. The stuff bytes in each adaptation field form a stuff byte area to be stuffed with expanded turbo packet fragments as described below.

The construction of the normal stream including the adaptation fields filled with stuff bytes is described in further detail below with reference to FIGS. 5A, 5B, and 6.

FIG. 5A is a diagram of an example of a conventional MPEG-2 TS packet. Referring to FIG. 5A, the conventional MPEG-2 TS packet consists of a 4-byte TS header and a 184-byte field that may be an adaptation field, or payload data, or a combination of an adaptation field and payload data. The various elements of the conventional MPEG-2 TS packet shown in FIG. 5A are well known in the art, and thus will not be explained in detail here.

FIG. 5B is a diagram of an example of an MPEG-2 TS packet including an adaptation field filled with stuff bytes according to an aspect of the invention. Referring to FIG. 5B, the MPEG-2 TS packet consists of a 4-byte header, an (2+n)-byte adaptation field, and (182-n)-byte payload data. The first two bytes of the adaptation field are an adaptation field (AF) header. The first byte (8 bits) of the AF header is an adaptation field length area containing information about the length of the adaptation field. The second byte (8 bits) of the AF header is an etc area containing indicators and flags as described below. The AF header is followed by n stuff bytes that merely occupy space without conveying any information. For example, the stuff bytes may have a value of 0 or any other suitable value that is defined as being a stuff byte. The presence or absence of the adaptation field is determined by a value of an adaptation field control bit in the MPEG-2 TS header.

The etc area of the AF header shown in FIG. 5B contains indicators and flags specified by the MPEG-2 transport stream standard. The first bit of the etc area is a discontinuity indicator. The second bit of the etc area is a random access indicator. The third bit of the etc area is an elementary stream priority indicator. The fourth bit of the etc area is a Program Clock Reference (PCR) flag that when set to 1 indicates that PCR data (42 bits) appears in the adaptation field. The fifth bit of the etc are is an Original Program Clock Reference (OPCR) flag that when set to 1 indicates that OPCR data (42 bits) appears in the adaptation field. The sixth bit of the etc area is a splicing point flag that when set to 1 indicates that splice countdown data (8 bits) appears in the adaptation field. The seventh bit of the etc area is a transport private data flag that indicates whether the adaptation field contains private data. The eighth bit of the etc area is an adaptation field extension flag that indicates whether an adaptation field extension field appears in the adaptation field. Since these indicators and flags are part of the MPEG-2 transport stream standard, they are well known in the art and will not be further described here.

If any of the five flags discussed above (corresponding to the fourth, fifth, sixth, seventh, and eighth bits of the etc area shown in FIG. 5B) indicate that the relevant data appears in the adaptation field, the relevant data is placed at the beginning of the adaptation field and the n stuff bytes are reduced by the number of bytes of the relevant data. For example, if the PCR flag (corresponding to the fourth bit of the etc area shown in FIG. 5B) is set to 1, the 42-bit PCR data is placed in the first 6 bytes (48 bits) of the adaptation field, and followed by n−6 stuff bytes as shown in FIG. 5B.

The transmission adaptor 410 of FIG. 4 receives a conventional MPEG-2 TS packets as a normal stream and generates the MPEG-2 TS packets including the adaptation fields filled with the stuff bytes according to an aspect of the invention as shown in FIG. 5B.

Figure 6:
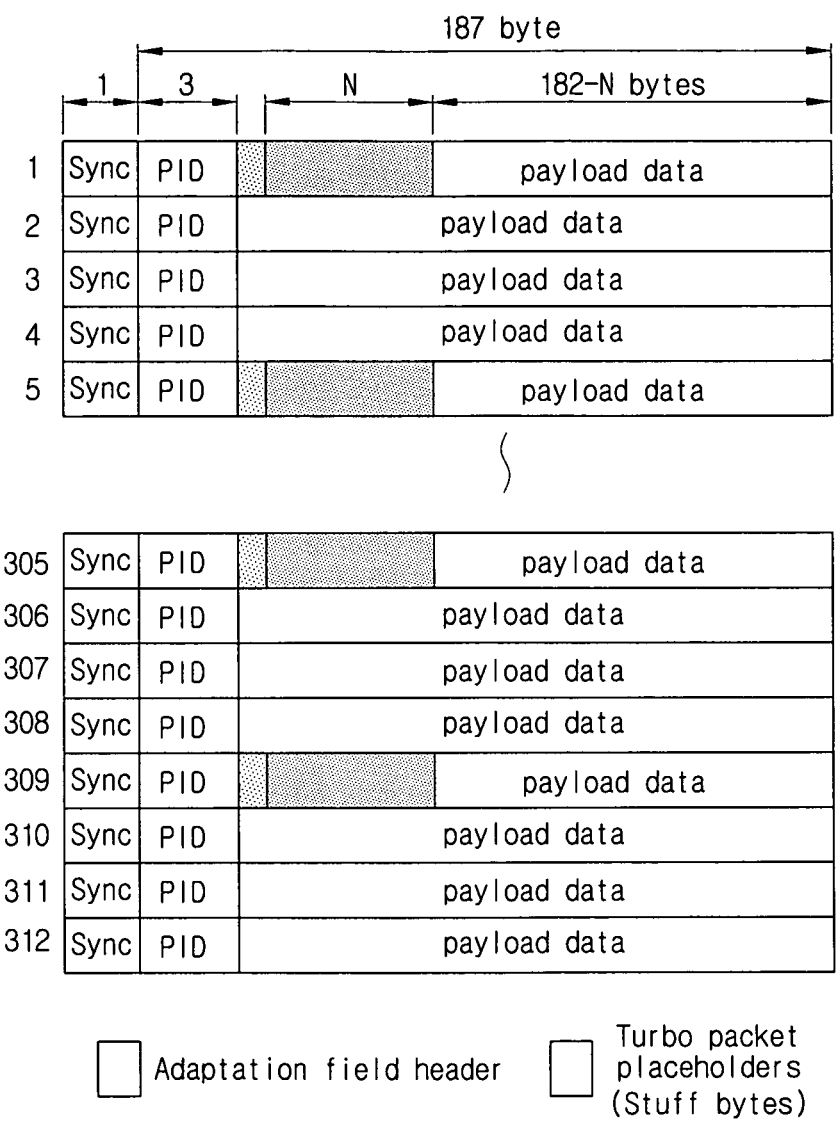
FIG. 6 is a diagram of an example of a re-packetized normal stream output from the transmission adaptor 410 of FIG. 4 according to an aspect of the invention.

FIG. 6 is a diagram of an example of the re-packetized normal stream output from the transmission adaptor 410 of FIG. 4 according to an aspect of the invention. Referring to FIG. 6, the re-packetized normal stream includes a plurality of consecutive packets. One normal stream field consists of 312 consecutive packets. Each packet of the re-packetized normal stream consists of 188 bytes, including a 1-byte sync signal, a 3-byte packet identity (PID), and a 184-byte data area. As shown in FIG. 6, a 2-byte AF header and an N-byte stuff byte area are provided in the 184-byte data area once every four packets, with the remaining 182−N bytes of the 184-byte data area being a payload data area carrying normal stream data. In each of the three packets that follow each of the packets containing the N-byte stuff byte area, the entire 184-byte data area is a payload data area carrying normal stream data. As can be seen from FIG. 6, when the N-byte stuff byte area is provided once every four packets, 78 N-byte stuff byte areas are provided in the 312 packets of one normal stream field. Note that the position and/or the length of the N-byte stuff byte area in the re-packetized normal stream may differ according to various aspects of the invention. For example, the N-byte stuff byte area may be provided in the 2nd, 6th, 10th, etc., packets in a field or in any other suitable positions, rather than in the 1st, 5th, 9th, etc, packets in a field as shown in FIG. 6, and N may be 86, 128, or any other suitable value. Also, the N-byte stuff byte area may be provided twice every four packets, three times every four packets, or four times every four packets (i.e., in every packet).

Furthermore, an entire packet in the dual TS can be dedicated to the transmission of turbo stream data by providing a null packet in the dual TS and stuffing the null packet with turbo stream data. Such a null packet can carry 184 bytes of turbo stream data. For example, if each four packets of the dual TS include two such null packets, an MPEG-2 TS packet including an adaptation field filled with stuff bytes in accordance with an aspect of the invention as shown in FIG. 5B where N=16 stuff bytes, and a conventional MPEG-2 TS packet as shown in FIG. 5A, each four packets of the dual TS can carry 384 bytes of turbo stream data (184 bytes in the first null packet, 184 bytes in the second null packet, and 16 bytes in the packet with an adaptation field filled with 16 stuff bytes). However, the invention is not limited to this example, and any suitable combination of the three types of packets may be used to carry any suitable number of bytes of turbo stream data.

Figure 7:
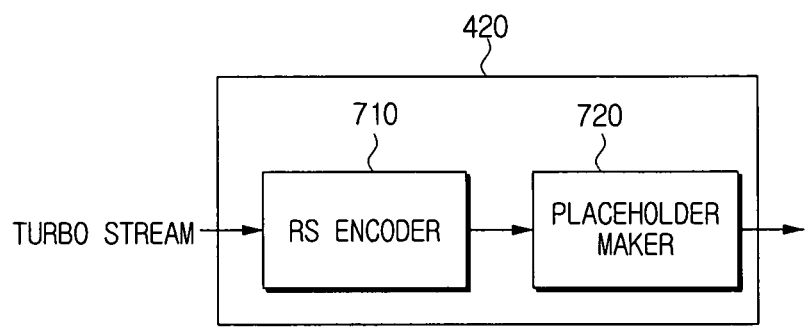
FIG. 7 is a block diagram of an example of the turbo pre-processor 420 of FIG. 4 according to an aspect of the invention.

FIG. 7 is a block diagram of an example of the turbo pre-processor 420 of FIG. 4 according to an aspect of the invention. As shown in FIG. 7, the turbo pre-processor 420 includes an RS encoder 710 and a placeholder maker 720. The RS encoder 710 encodes a turbo stream that is input to the RS encoder 710 from a service multiplexer (not shown).

Figure 8:
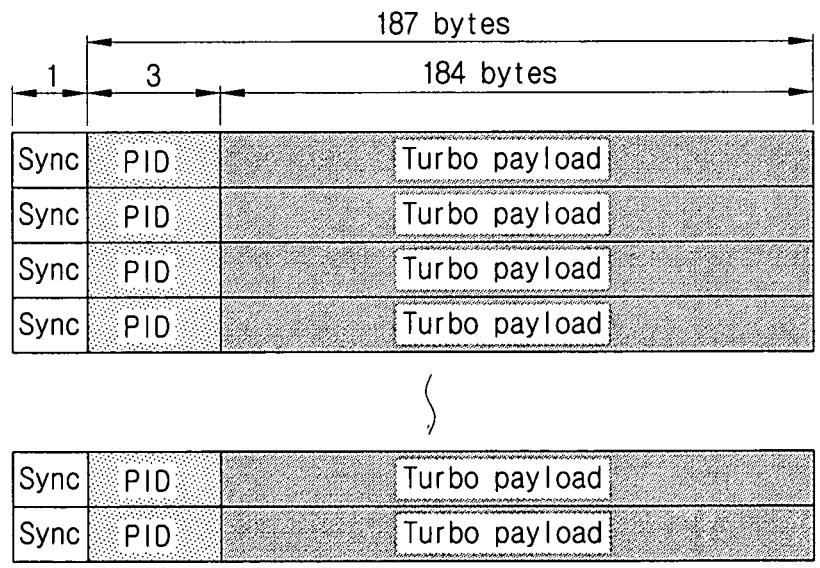
FIG. 8 is a diagram of an example of an input turbo stream input to the turbo pre-processor 420 of FIG. 4 according to an aspect of the invention.

FIG. 8 is a diagram of an example of an input turbo stream input to the RS encoder 710 of FIG. 7 according to an aspect of the invention. Referring to FIG. 8, the input turbo stream includes a plurality of consecutive packets. Each packet of the input turbo stream consists of 188 bytes, including 1 sync signal byte, 3 PID bytes, and 184 turbo payload bytes. The RS encoder 710 removes the 1 sync signal byte from the each of the packets in the input turbo stream, calculates 20 parity bytes for the remaining 187 bytes in each of the packets using a (207, 187) RS code, and appends the 20 parity bytes to each of the packets to obtain an encoded turbo stream.

Figure 9:
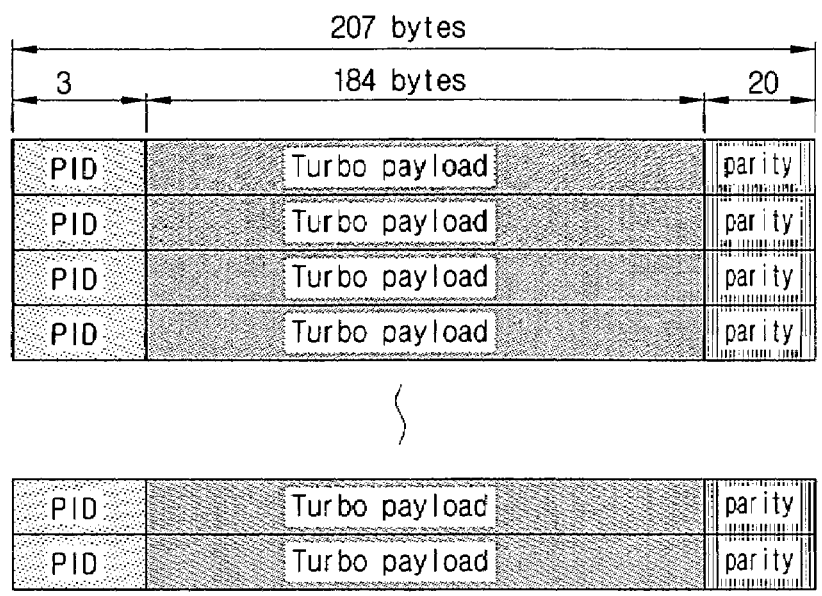
FIG. 9 is a diagram of an example of an encoded turbo stream output from the RS encoder 710 of FIG. 7 according to an aspect of the invention.

FIG. 9 is a diagram of an example of the encoded turbo stream output from the RS encoder 710 according to an aspect of the invention that includes the 20 parity bytes appended to the packets during the (207, 187) RS encoding. As a result, each packet of the encoded turbo stream consists of 207 bytes, including 3 PID bytes, 184 turbo payload bytes, and 20 parity bytes.

The placeholder maker 720 inserts a parity insertion area in the encoded turbo stream output from the RS encoder 710. The process of inserting the parity insertion area will now be described. The constituent unit of the encoded turbo stream is a byte, and each byte of the encoded turbo stream is expanded to 2 or 4 bytes to obtain an expanded turbo stream. Each of the 2 or 4 bytes is stuffed with some of the bit values of the original byte and null data (e.g., 0). The area of the 2 or 4 bytes stuffed with the null data is the parity insertion area. Expanding each byte of the encoded turbo stream to 2 bytes is a 1/2 rate conversion. Expanding each byte of the encoded turbo stream to 4 bytes is a 1/4 rate conversion.

Figure 10:
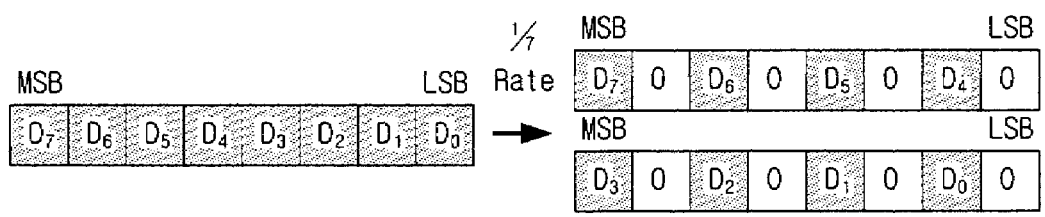
FIG. 10 is a diagram of an example of a process of inserting a parity insertion area in an encoded turbo stream during a 1/2 rate conversion of the encoded turbo stream performed by the placeholder maker 720 of FIG. 7 according to an aspect of the invention.

FIG. 10 is a diagram of an example of the process of inserting the parity insertion area in the encoded turbo stream during a 1/2 rate conversion performed by the placeholder maker 720 of FIG. 7 according to an aspect of the invention. The placeholder maker 720 generates two bytes from each byte of the encoded turbo stream by performing the 1/2 rate conversion on each byte of the encoded turbo stream. As shown in FIG. 10, one byte of the encoded turbo stream including bits D0 through D7 is divided into two 4-bit groups, one of which includes the D0 through D3 bits and the other of which includes the D4 through D7 bits. Next, each of the two 4-bit groups is expanded to an 8-bit byte by inserting a null bit after every bit to obtain a first byte (D7, 0, D6, 0, D5, 0, D4, 0) including the D4 through D7 bits and a second byte (D3, 0, D2, 0, D1, 0, D0, 0) including the D0 through D3 bits. The 0 bits in the first and second bytes are the null bits and are used as the parity insertion area. In the example shown in FIG. 10, the second, fourth, sixth, and eighth bits in the first and second bytes are used as the parity insertion area. However, the invention is not limited to this example, and the position of the parity insertion area may vary. For example, the parity insertion area may be the second, third, sixth, and seventh bits, or the third, fourth, fifth, and sixth bits, or any other suitable combination of four of the eight bits. Furthermore, the combination of bits used as the parity insertion area may be different in each of the first and second bytes. Although 0 bits are used as the null bits in FIG. 10, the invention is not limited to this example, and 1 bits or a combination of 0 bits and 1 bits can be used as the null bits.

Figure 11:
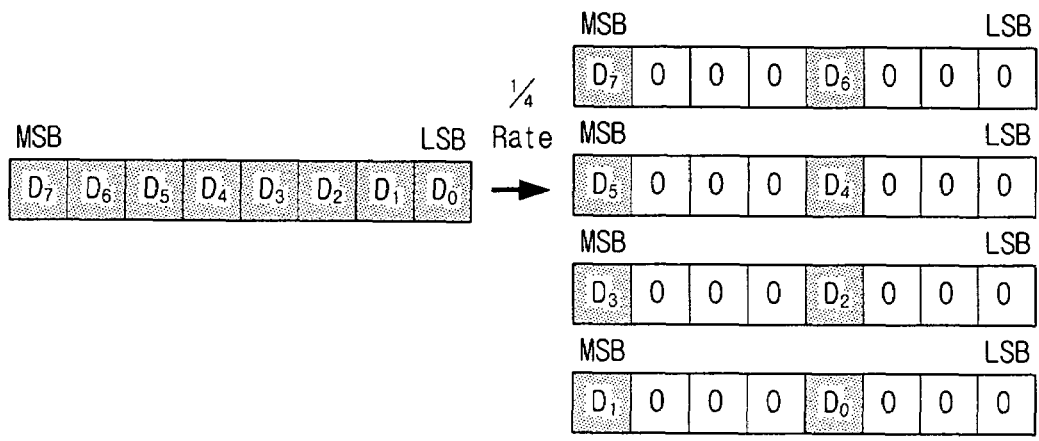
FIG. 11 is a diagram of an example of a process of inserting a parity insertion area in an encoded turbo stream during a 1/4 rate conversion of the encoded turbo stream performed by the placeholder maker 720 of FIG. 7 according to an aspect of the invention.

FIG. 11 is a diagram of an example of the process of inserting the parity insertion area in the encoded turbo stream during a 1/4 rate conversion performed by the placeholder maker 720 of FIG. 7 according to an aspect of the invention. The placeholder maker 720 generates four bytes from each byte of the encoded turbo stream by performing the 1/4 rate conversion on each byte of the encoded turbo stream. As shown in FIG. 11, one byte of the encoded turbo stream including bits D0 through D7 is divided into four 2-bit groups, one of which includes the D0 and D1 bits, another of which includes the D2 and D3 bits, another of which includes the D4 and D5 bits, and another of which includes the D6 and D7 bits. Next, each of the four 2-bit groups is expanded to an 8-bit byte by inserting three null bits after every bit to obtain a first byte (D7, 0, 0, 0, D6, 0, 0, 0) including the D6 and D7 bits, a second byte (D5, 0, 0, 0, D4, 0, 0, 0) including the D4 and D5 bits, a third byte (D3, 0, 0, 0, D2, 0, 0, 0) including the D2 and D3 bits, and a fourth byte (D1, 0, 0, 0, D0, 0, 0, 0) including the D0 and D1 bits. The 0 bits in the first, second, third, and fourth bytes are the null bits and are used as the parity insertion area. In the example shown in FIG. 11, the second, third, fourth, sixth, seventh, and eighth bits in the first, second, third, and fourth bytes are used as the parity insertion area. However, the invention is not limited to this example, and the position of the parity insertion area may vary. For example, the parity insertion area may be the first, third, fourth, fifth, seventh, and eighth bits, or the first, second, fourth, fifth, sixth, and eighth bits, or any other suitable combination of six of the eight bits. Furthermore, the combination of bits used as the parity insertion area may be different in two or more of the first, second, third, and fourth bytes. Although 0 bits are used as the null bits in FIG. 11, the invention is not limited to this example, and 1 bits or a combination of 0 bits and 1 bits can be used as the null bits.

Figure 12:
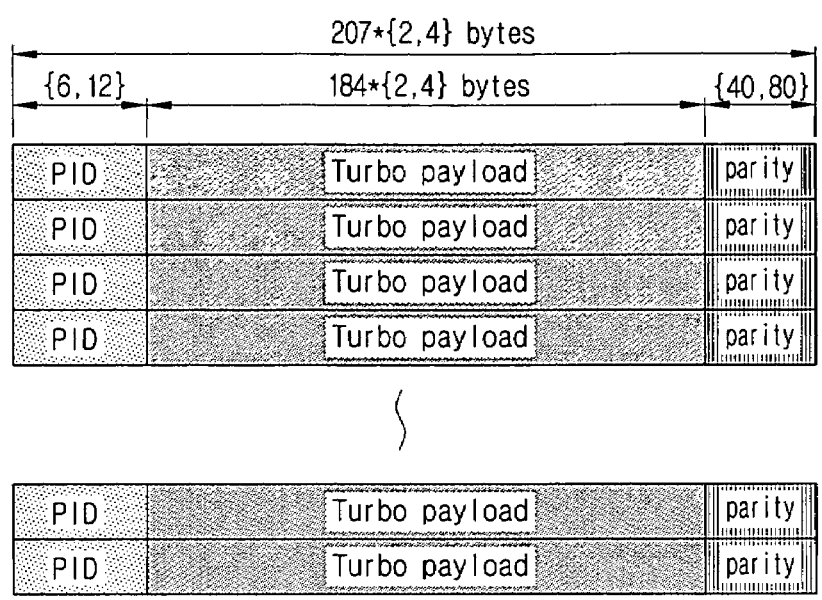
FIG. 12 is a diagram of an example of an expanded turbo stream output from the placeholder maker 720 of FIG. 7 according to an aspect of the invention.

FIG. 12 is an example of the expanded turbo stream output from the turbo pre-processor 420 after the RS encoding and the data expansion have been performed on the input turbo stream in the turbo pre-processor 420 of FIGS. 4 and 7 according to an aspect of the invention. In the expanded turbo stream shown in FIG. 12, the 20 parity bytes were appended during the RS encoding. Each of the PID bytes, the turbo payload bytes, and the parity byte were expanded to two or four bytes during the 1/2 or 1/4 rate conversion performed during the data expansion. If the 1/2 rate conversion was performed, each packet of the expanded turbo stream consists of 414 bytes, including 6 PID bytes, 368 turbo payload bytes, and 40 parity bytes. If the 1/4 rate conversion was performed, each packet of the expanded turbo stream consists of 828 bytes, including 12 PID bytes, 736 turbo payload bytes, and 80 parity bytes.

Referring again to FIG. 4, the turbo packet stuffer 430 of FIG. 4 multiplexes the re-packetized normal stream output from the transmission adaptor 410 and the expanded turbo stream output from the placeholder maker 720 of FIG. 7 which is the output of the turbo pre-processor of FIGS. 4 and 7 to generate a dual transmission stream in which the re-packetized normal stream and the expanded turbo stream are combined.

By way of example, the turbo packet stuffer 430 segments the packets of the expanded turbo stream output from the turbo pre-processor 420 into N-byte turbo packet fragments, where N is the number of stuff bytes in each of the adaptation fields, and stuffs the turbo packet fragments into the stuff byte areas of the adaptation fields of the re-packetized normal stream in sequence. That is, the length of each of the turbo packet fragments is equal to the length of the stuff byte area of the adaptation field. In other words, the number of bytes in each of the turbo packet fragments is equal to the number N of stuff bytes in the adaptation field.

Figure 13:
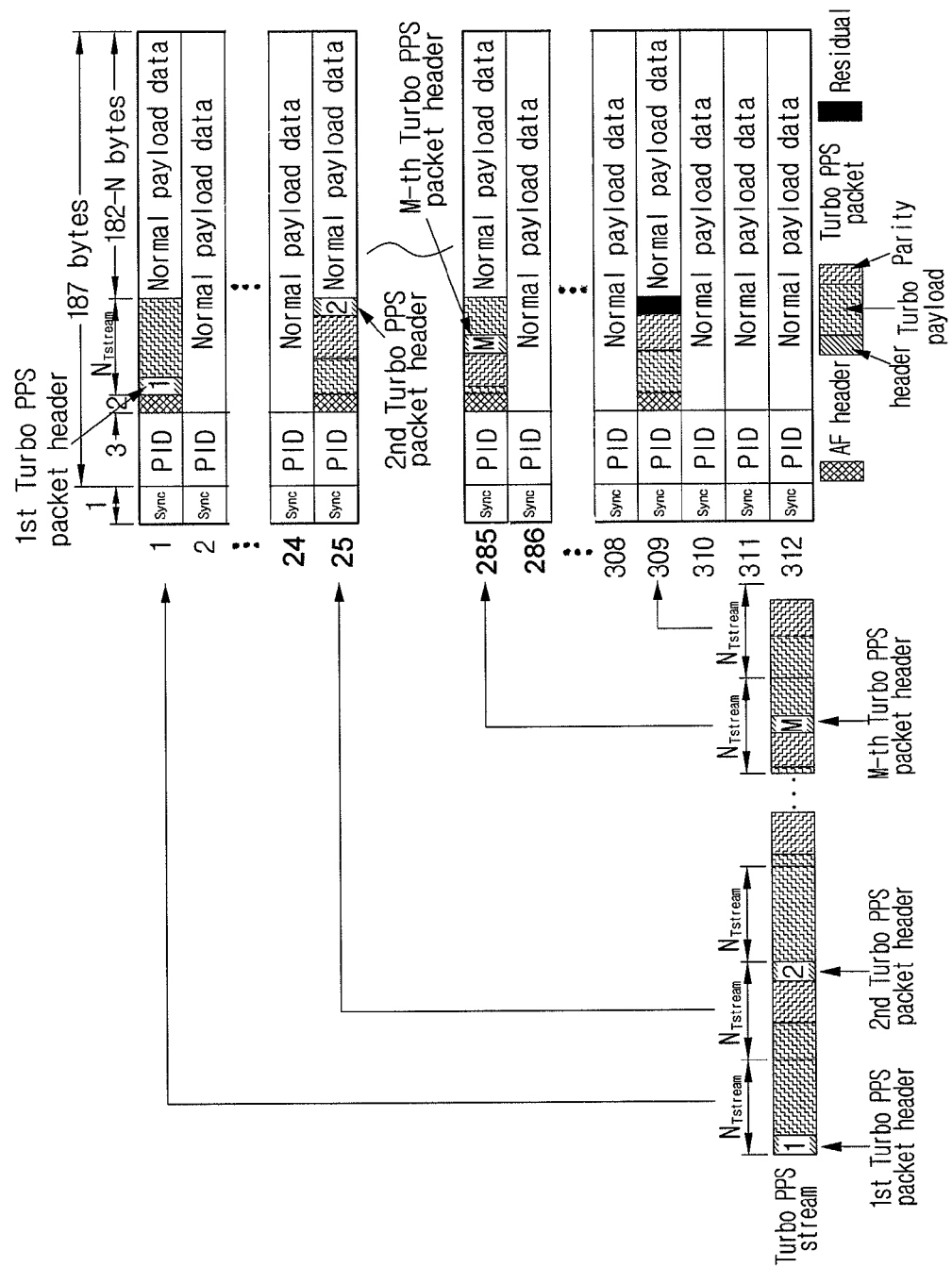
FIG. 13 is a diagram of an example of a dual transmission stream output from the turbo packet stuffer 430 of FIG. 4 according to an aspect of the invention.

FIG. 13 is a diagram of an example of the dual transmission stream output from the turbo packet stuffer 430 of FIG. 4 which is the output of a dual transmission stream generating device according to an aspect of the invention. In FIG. 13, "Turbo PPS" is an abbreviation of "turbo pre-processed stream" which is the output of the turbo pre-processor 420 of FIGS. 4 and 7 and is referred to above as the "expanded turbo stream". FIG. 13 shows an example of a dual transmission stream in which N=128 stuff bytes, M=12 turbo PPS packets, a residual=48 unused stuff bytes, and the conversion rate of the placeholder maker 720 in FIG. 7 is 1/4. N is the number of stuff bytes in each of the adaptation fields of the re-packetized normal stream, and is also the length of each of the turbo PPS packet fragments. M is the number of turbo PPS packets that can be stuffed into one field of the re-packetized normal stream. In the example shown in FIG. 13, when a turbo PPS packet fragment having a length of 128 bytes is stuffed into every fourth packet of the re-packetized normal stream, i.e., into 78 of the 312 packets in one field, and the number N of stuff bytes in each of the adaptation fields is 128 bytes, the maximum number of turbo PPS packet fragment bytes that can be stuffed into one field is 128*78=9984 bytes. When the conversion rate of the placeholder maker 720 in FIG. 7 is 1/4 rate, the length of one turbo PPS packet is 207*4=828 bytes, and accordingly 12 turbo PPS packets (12*828=9936) bytes can be stuffed into one field. This leaves a residual of 48 unused stuff bytes (9984−9936=48 bytes) in the last packet having an adaptation field in each field of the dual transmission stream shown in FIG. 13.

Since the residual of 48 unused stuff bytes is less than the 128 bytes of a turbo PPS packet fragment, the next turbo PPS packet fragment, which is the first turbo packet fragment of a new turbo PPS packet (i.e., a 13th turbo PPS packet relative to the 12 turbo PPS packets in the previous field) will be stuffed into the first packet having an adaptation field in the next field of the re-packetized normal stream. Accordingly, since the turbo PPS is stuffed into the re-packetized normal stream field by field, the first turbo PPS packet fragment in each field of the dual TS will always be the first turbo PPS packet fragment of a new PPS packet. However, the invention is not limited to this example, and N can have a value other than 128 bytes and/or the conversion rate can have a value of other than 1/4 or 1/2 so that the first turbo PPS packet fragment in each field of the dual TS may not necessarily always be the first turbo PPS packet fragment of a new PPS packet.

The dual transmission stream shown in FIG. 13 which is generated by the TS constructor 310 of FIG. 3 which is an example of a dual transmission stream generating device according to an aspect of the invention is transmitted to a receiver after passing through the randomizer 320, the RS encoder 330, the interleaver 340, the turbo processor 350, the trellis encoder 360, the multiplexer 370, the VSB modulator 380, and the RF converter 390 shown in FIG. 3. The turbo processor 350 extracts only the turbo stream from the dual transmission stream, and performs a turbo processing only on the turbo stream to make the turbo stream a more robust data stream by calculating parity information for the turbo stream using a turbo encoding process and inserting the parity information into the parity insertion area in the turbo stream, that is, into the parity insertion area inserted by the placeholder maker 720 of FIG. 7, and correcting errors in parity bytes appended to the turbo stream by the RS encoder 330 caused by the turbo processing. The turbo processing is a robust data process that provides improved reception performance for the turbo stream compared to the normal stream over an inferior channel, particularly over a Doppler fading channel. Hardware to process and transmit the generated dual TS can be implemented using various techniques well known in the art, and thus a further description of such hardware will be omitted for the sake of conciseness.

Figure 14:
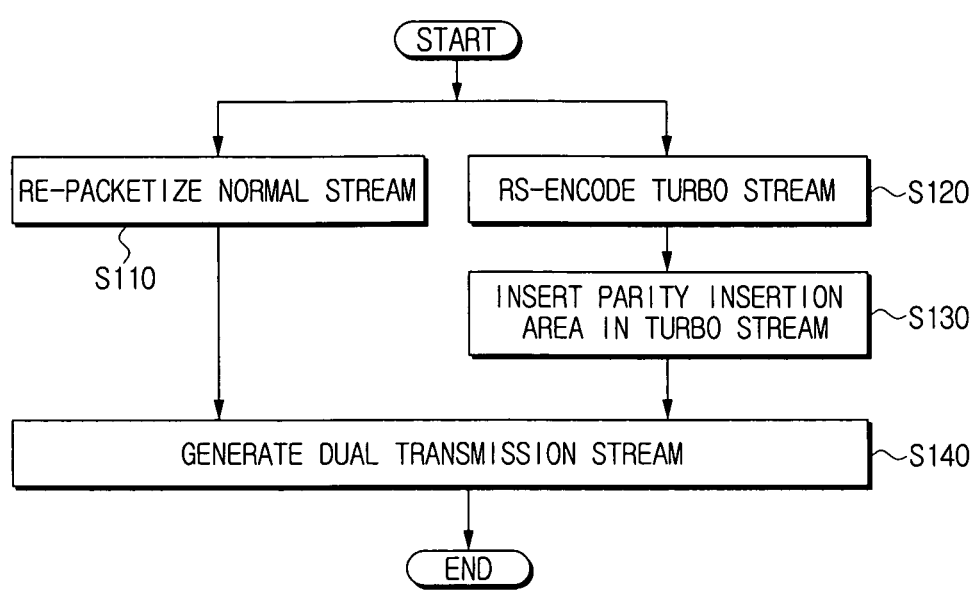
FIG. 14 is a flowchart of an example of a dual transmission stream generating method according to an aspect of the invention.

FIG. 14 is a flowchart of an example of a dual transmission stream generating method according to an aspect of the invention. The transmission adaptor 410 of FIG. 4 re-packetizes a normal stream to include adaptation fields filled with stuff bytes (block S110). The RS encoder 710 of FIG. 7 calculates parity bytes for a turbo stream and appends the parity bytes to the turbo stream to obtain an encoded turbo stream (block S120). The placeholder maker 720 of FIG. 7 expands the encoded turbo stream by inserting a parity insertion area in the encoded turbo stream while performing a 1/2 or 1/4 rate conversion to obtain an expanded turbo stream (block S130). The turbo packet stuffer 430 of FIG. 4 generates a dual transmission stream by segmenting turbo packets of the expanded turbo stream into N-byte turbo packet fragments, where N is the number of stuff bytes in each of the adaptation fields, and sequentially stuffing the turbo packet fragments into the stuff byte areas of the adaptation fields of the re-packetized normal stream (block S140).

In light of the foregoing, it is possible to generate a dual transmission stream including a normal stream and a turbo stream to enhance the reception performance of the ATSC VSB DTV system which is an American-type digital terrestrial broadcasting system. In particular, in accordance with an aspect of the invention, the turbo stream can be subjected to a turbo processing which is a robust data process using a turbo encoding process by inserting stuff byte areas into the normal stream, inserting parity insertion areas into the turbo stream, stuffing the turbo stream with the parity insertion areas into the stuff byte areas of the normal stream, inserting parity information calculated by the turbo processing into the parity insertion areas of the turbo stream, and correcting errors in parity bytes caused by the turbo processing. Additionally, a dual transmission stream system in accordance with an aspect of the invention can provide an improved reception performance for the turbo stream in diverse reception environments compared with the normal stream with a simple system while maintaining compatibility with the conventional normal stream transmission system.

Although several embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A dual transmission stream generating device comprising:
   a turbo pre-processor that receives a turbo stream, encodes the turbo stream to obtain an encoded turbo stream, and processes the encoded turbo stream to obtain a processed turbo stream;
   a turbo packet stuffer that receives a normal stream and the processed turbo stream, segments the processed turbo stream into fragments having a specified size, and generates a dual transmission stream by stuffing the fragments of the processed turbo stream into a specified area of the normal stream; and
   a transmission adaptor that receives the normal stream, re-packetizes the normal stream to obtain a re-packetized normal stream, and outputs the re-packetized normal stream to the turbo packet stuffer,
   wherein the turbo packet stuffer receives the re-packetized normal stream as the normal stream, and generates the dual transmission stream by stuffing the fragments of the processed turbo stream into the re-packetized normal stream,
   wherein the turbo pre-processor performs 1/4 rate conversion for at least one part of the turbo steam.

2. The dual transmission stream generating device of claim 1, wherein the normal stream and the dual transmission stream each comprise a plurality of fields;
   wherein the processed turbo stream comprises a plurality of turbo packets; and
   wherein the turbo packet stuffer segments each of the turbo packets into a plurality of turbo packet fragments having the specified size, and generates the dual transmission stream by stuffing the turbo packet fragments into the re-packetized normal stream field by field so that a first turbo packet fragment in each of the fields of the dual transmission stream is always a first turbo packet fragment of a new one of the turbo packets.

3. The dual transmission stream generating device of claim 2, wherein the turbo packet fragments are stuffed into stuff bytes provided in the repacketized normal stream,
   wherein M complete turbo packets are stuffed into each of the fields of the normal stream, where M is an integer greater than or equal to 1; and
   wherein a difference between a total size of the stuff bytes of the re-packetized normal stream in each of the fields of the normal stream and a total size of the M complete turbo packets stuffed into each of the fields of the normal stream is less than a size of each of the turbo packet fragments.

4. The dual transmission stream generating device of claim 1, wherein the specified area of the normal stream comprises a plurality of stuff byte areas of the normal stream; and
   wherein a length of each of the fragments of the processed turbo stream is equal to a length of each of the stuff byte areas.

5. The dual transmission stream generating device of claim 1, wherein the dual transmission stream comprises a plurality of fields each comprising a plurality of packets; and
   wherein the turbo packet stuffer stuffs the fragments of the processed turbo stream into ones of the packets appearing at preset intervals in each of the fields.

6. The dual transmission stream generating device of claim 1, wherein the turbo pre-processor comprises:
   a Reed-Solomon encoder that receives the turbo stream, encodes the turbo stream using a Reed-Solomon encoding process to obtain parity data, and appends the parity data to the turbo stream to obtain the encoded turbo stream; and
   a placeholder maker that receives the encoded turbo stream, and inserts a parity insertion area into the encoded turbo stream to obtain the processed turbo stream.

7. The dual transmission stream generating device of claim 6, wherein the encoded turbo stream and the processed turbo stream each comprise a plurality of bytes; and wherein the placeholder maker performs a 1/2 rate conversion of the encoded turbo stream by converting each of the bytes of the encoded turbo stream into 2 bytes of the processed turbo stream.

8. The dual transmission stream generating device of claim 7, wherein each of the bytes of the encoded turbo stream consists of 8 bits arranged in an order D7, D6, D5, D4, D3, D2, D1, D0;
   wherein a first byte of the 2 bytes of the processed turbo stream consists of 8 bits arranged in an order D7, 0, D6, 0, D5, 0, D4, 0;
   wherein a second byte of the 2 bytes of the processed turbo stream consist of 8bits arranged in an order D3, 0, D2, 0, Dl, 0, D0, 0; and
   wherein the 0 bits in the first and second bytes are part of the parity insertion area.

9. The dual transmission stream generating device of claim 6, wherein the encoded turbo stream and the processed turbo stream each comprise a plurality of bytes; and
   wherein the placeholder maker performs a 1/4 rate conversion of the encoded turbo stream by converting each of the bytes of the encoded turbo stream into 4 bytes of the processed turbo stream.

10. The dual transmission stream generating device of claim 9, wherein each of the bytes of the encoded turbo stream consists of 8 bits arranged in an order D7, D6, D5, D4, D3, D2, D1, D0;
   wherein a first byte of the 4 bytes of the processed turbo stream consists of 8 bits arranged in an order D7, 0, 0, 0, D6, 0, 0, 0;
   wherein a second byte of the 4 bytes of the processed turbo stream consist of 8 bits arranged in an order D5, 0, 0, 0, D4, 0, 0, 0;
   wherein a third byte of the 4 bytes of the processed turbo stream consists of 8 bits arranged in an order D3, 0, 0, 0, D2, 0, 0, 0;
   wherein a fourth byte of the 4 bytes of the processed turbo stream consist of 8 bits arranged in an order Dl, 0, 0, 0, D0, 0, 0, 0; and
   wherein the 0 bits in the first, second bytes, third, and fourth bytes are part of the parity insertion area.

11. The dual transmission stream generating device of claim 1,
   wherein the specified area of the normal stream is an area within each packet of selected normal stream packets in the normal stream, the each packet being by a segment sync area.

12. A dual transmission stream generating method comprising:
   receiving a turbo stream;
   encoding, using a pre-processor, the turbo stream to obtain an encoded turbo stream;
   processing the encoded turbo stream to obtain a processed turbo stream;
   receiving a normal stream and re-packetizing the normal stream to obtain a re-packetized normal stream;
   segmenting the processed turbo stream into fragments having a specified size;
   generating, using a packet staffer, a dual transmission stream by stuffing the fragments of the processed turbo stream into the specified area of the normal stream,
   wherein the generating the dual transmission stream comprises stuffing the fragments of the processed turbo stream into the re-packetized normal stream,
   wherein at least one part of the turbo steam is 1/4 rate converted.

13. The dual transmission stream generating method of claim 12, wherein the normal stream and the dual transmission stream each comprise a plurality of fields;
   wherein the processed turbo stream comprises a plurality of turbo packets;
   wherein the segmenting of the processed turbo stream comprises segmenting each of the turbo packets into a plurality of turbo packet fragments having the specified size; and
   wherein the generating of the dual transmission stream comprises stuffing the turbo packet fragments into the re-packetized normal stream field by field so that a first turbo packet fragment in each of the fields of the dual transmission is always a first turbo packet fragment of a new one of the turbo packets.

14. The dual transmission stream generating method of claim 13, wherein the turbo packet fragments are stuffed into stuff bytes provided in the repacketized normal stream,
   wherein M complete turbo packets are stuffed into each of the fields of the normal stream, where M is an integer greater than or equal to 1; and
   wherein a difference between a total size of the stuff bytes of the normal stream in each of the fields of the normal stream and a total size of the M complete turbo packets stuffed into each of the fields of the normal stream is less than a size of each of the turbo packet fragments.

15. The dual transmission stream generating method of claim 12, wherein the specified area of the normal stream comprises a plurality of stuff byte areas of the normal stream; and
   wherein a length of each of the fragments of the processed turbo stream is equal to a length of each of the stuff byte areas.

16. The dual transmission stream generating method of claim 12, wherein the dual transmission stream comprises a plurality of fields each comprising a plurality of packets; and
   wherein the generating of the dual transmission stream comprises stuffing the fragments of the processed turbo stream into ones of the packets appearing at preset intervals in each of the fields.

17. The dual transmission stream generating method of claim 12, wherein the encoding of the turbo stream comprises:
   encoding the turbo stream using a Reed-Solomon encoding process to obtain parity data; and
   appending the parity data to the turbo stream to obtain the encoded turbo stream; and
   wherein the processing of the encoded turbo stream comprises inserting a parity insertion area into the encoded turbo stream to obtain the processed turbo stream.

18. The dual transmission stream generating method of claim 17, wherein the encoded turbo stream and the processed turbo stream each comprise a plurality of bytes; and
   wherein the inserting of the parity insertion area comprises performing a 1/2 rate conversion of the encoded turbo stream by converting each of the bytes of the encoded turbo stream into 2 bytes of the processed turbo stream.

19. The dual transmission stream generating method of claim 18, wherein each of the bytes of the encoded turbo stream consists of 8 bits arranged in an order D7, D6, D5, D4, D3, D2, D1, D0;
   wherein a first byte of the 2 bytes of the processed turbo stream consists of 8 bits arranged in an order D7, 0, D6, 0, D5, 0, D4, 0;
   wherein a second byte of the 2 bytes of the processed turbo stream consist of 8 bits arranged in an order D3, 0, D2, 0, Dl, 0, D0, 0; and wherein the 0 bits in the first and second bytes are part of the parity insertion area.

20. The dual transmission stream generating method of claim 17, wherein the encoded turbo stream and the processed turbo stream each comprise a plurality of bytes; and
wherein the inserting of the parity insertion area comprises performing a 1/4 rate conversion of the encoded turbo stream by converting each of the bytes of the encoded turbo stream into 4 bytes of the processed turbo stream.

21. The dual transmission stream generating method of claim 20, wherein each of the bytes of the encoded turbo stream consists of 8 bits arranged in an order D7, D6, D5, D4, D3, D2, D1, D0;
wherein a first byte of the 4 bytes of the processed turbo stream consists of 8 bits arranged in an order D7, 0, 0, 0, D6, 0, 0, 0;
wherein a second byte of the 4 bytes of the processed turbo stream consist of 8 bits arranged in an order D5, 0, 0, 0, D4, 0, 0, 0;
wherein a third byte of the 4 bytes of the processed turbo stream consists of 8 bits arranged in an order D3, 0, 0, 0, D2, 0, 0, 0;
wherein a fourth byte of the 4 bytes of the processed turbo stream consist of 8 bits arranged in an order Dl, 0, 0, 0, D0, 0, 0, 0; and
wherein the 0 bits in the first, second bytes, third, and fourth bytes are part of the parity insertion area.

22. The dual transmission stream generating method of claim 12, wherein the encoded turbo stream is obtained by Reed-Solomon (RS) coding, and
wherein the specified area of the normal stream includes an area within a segment led by a segment sync in the normal stream.

23. A digital broadcasting transmitter comprising:
a turbo pre-processor to receive a supplementary data stream, encode the supplementary data stream, and process the encoded supplementary data stream;
a transmission adaptor to receive a normal data stream, re-packetize the normal data stream to obtain a re-packetized normal data stream, and output the re-packetized normal data stream; and
a turbo packet staffer to packetize a transmission stream by segmenting the processed supplementary data stream into fragments and stuffing the fragments into the re-packetized normal data stream,
wherein the turbo pre-processor performs 1/4 rate conversion for at least one part of the supplementary data steam.

24. The digital broadcasting transmitter of claim 23, wherein the turbo packet stuffer stuffs a preset processing unit of the supplementary data stream into the re-packetized normal data stream.

25. The digital broadcasting transmitter of claim 23, wherein the turbo pre-processor encode the supplementary data stream by Reed-Solomon (RS) coding, and
wherein the area in the normal data stream includes an area within a segment led by a segment sync in the normal data stream.

26. A digital broadcasting transmitter comprising:
a turbo pre-processor to receive a supplementary data stream, encode the supplementary data stream, and process the encoded supplementary data stream;
a transmission adaptor to receive a normal data stream and convert the normal data stream into a stream having an area to which the supplementary data stream is stuffed; and
a turbo packet stuffer to packetize a transmission stream by segmenting the processed supplementary data stream into fragments and stuffing the fragments into the area in the normal data stream, wherein:
the transmission adaptor prepares a plurality of areas in the normal data stream; and
the turbo packet stuffer stuffs one preset processing unit of the supplementary data stream into the plurality of areas in the normal data stream, and ensures that any residual portion of a last one of the plurality of areas that is empty after the stuffing of the one preset processing unit of the supplementary data stream has been completed remains empty.

27. A digital broadcasting transmitter comprising:
a turbo pre-processor to receive a supplementary data stream, encode the supplementary data stream, and process the encoded supplementary data stream;
a transmission adaptor to receive a normal data stream and convert the normal data stream into a stream having an area to which the supplementary data stream is stuffed; and
a turbo packet stuffer to packetize a transmission stream by segmenting the processed supplementary data stream into fragments and stuffing the fragments into the area in the normal data stream, wherein:
the transmission adaptor prepares a plurality of areas in the normal data stream;
the turbo packet stuffer stuffs a first preset processing unit of the supplementary data stream into a first group of areas in the normal data stream selected from the plurality of areas in the normal data stream, and stuffs a second preset processing unit of the supplementary data stream into a second group of areas in the normal data stream selected from the plurality of areas in the normal data stream; and
when a residual portion of a last area of the first group of areas is empty after the stuffing of the first preset processing unit of the supplementary data stream has been completed, the last area of the first group of areas becomes a first area of the second group of areas, and the turbo packet stuffer stuffs the second preset processing unit of the supplementary data stream into the second group of areas beginning with the residual portion of the last area of the first group of areas.

28. A digital broadcasting transmitter comprising:
a turbo pre-processor to receive a supplementary data stream, encode the supplementary data stream, and process the encoded supplementary data stream;
a transmission adaptor to receive a normal data stream and convert the normal data stream into a stream having an area to which the supplementary data stream is stuffed; and
a turbo packet stuffer to packetize a transmission stream by segmenting the processed supplementary data stream into fragments and stuffing the fragments into the area in the normal data stream, wherein:
the transmission adaptor prepares a plurality of areas in a preset number of preset processing units of the normal data stream; and
the turbo packet stuffer stuffs a preset number of preset processing units of the supplementary data stream into the plurality of areas in the preset number of preset processing units of the normal data stream, and ensures that any residual portion of a last one of the plurality of areas that is empty after the stuffing of the preset number of preset processing units of the supplementary data has been completed remains empty.

29. A digital broadcasting transmission method comprising:
receiving a supplementary data stream;
performing, using a pre-processor, encoding the supplementary data stream and processing the encoded supplementary data stream;
receiving a normal data stream;
re-packetizing the normal data stream to obtain a re-packetized normal data stream; and
packetizing, using a packetizer, a transmission stream by segmenting the processed supplementary data stream into fragments and stuffing the fragments into the re-packetized normal data stream,
wherein at least one part of the supplementary data steam is 1/4 rate converted.

30. The digital broadcasting transmission method of claim 29, wherein the packetizing of the transmission stream comprises stuffing a preset processing unit of the supplementary data stream into the re-packetized normal data stream.

31. The digital broadcasting transmission method of claim 29, wherein:
the preparing of the area in the normal data stream comprises preparing a plurality of areas in the normal data stream; and
the packetizing of the transmission stream comprises:
stuffing one preset processing unit of the supplementary data stream into the plurality of areas in the re-packetized normal data stream; and
ensuring that any residual portion of a last one of the plurality of areas that is empty after the stuffing of the one preset processing unit of the supplementary data stream has been completed remains empty.

32. The digital broadcasting transmission method of claim 29, wherein;
the preparing of the area in the normal data stream comprises preparing a plurality of areas in the normal data stream; and
the packetizing of the transmission stream comprises:
stuffing a first preset processing unit of the supplementary data stream into a first group of areas in the re-packetized normal data stream selected from the plurality of areas in the re-packetized normal data stream;
stuffing a second preset processing unit of the supplementary data stream into a second group of areas in the re-packetized normal data stream selected from the plurality of areas in the re-packetized normal data stream; and
when a residual portion of a last area of the first group of areas is empty after the stuffing of the first preset processing unit of the supplementary data stream has been completed, the last area of the first group of areas becomes a first area of the second group of areas, and the stuffing of the second preset processing unit comprises stuffing the second preset processing unit of the supplementary data stream into the second group of areas beginning with the residual portion of the last area of the first group of areas.

33. The digital broadcasting transmission method of claim 29, wherein:
the preparing of the area in the normal data stream comprises preparing a plurality of areas in a preset number of preset processing units of the normal data stream; and
the packetizing of the transmission stream comprises:
stuffing a preset number of preset processing units of the supplementary data stream into the plurality of areas in the preset number of preset processing units of the re-packetized normal data stream; and
ensuring that any residual portion of a last one of the plurality of areas that is empty after the stuffing of the preset number of preset processing units of the supplementary data has been completed remains empty.

34. The digital broadcasting transmission method of claim 29, wherein the encoding the supplementary data stream comprises Reed-Solomon (RS) coding, and
wherein the area in the normal data stream includes an area within a segment led by a segment sync in the normal data stream.

35. A digital broadcasting transmission method comprising:
repacketizing a normal data stream to obtain a repacketized normal data stream;
preparing an area in a supplementary data stream, which is coded by Reed-Solomon (RS) coding, by processing the supplementary data stream according to a preset conversion rate;
inserting a parity for the supplementary data stream into the area in the processed supplementary data stream;
segmenting the parity-inserted processed supplementary data stream into fragments and generating a dual transmission stream by stuffing the fragments into a specified area in a normal data stream; and
performing convolutional encoding of the dual transmission stream,
wherein at least one part of the supplementary data steam is 1/4 rate converted.

36. The digital broadcasting transmission method of claim 35, wherein when the preset conversion rate is a 1/2 conversion rate, the preparing of the area in the supplementary data stream comprises processing each byte of the supplementary data stream two bytes by inserting one null bit constituting part of the area after each data bit of the supplementary data stream.

37. The digital broadcasting transmission method of claim 35, wherein when the preset conversion rate is a 1/4 conversion rate, the preparing of the area in the supplementary data stream comprises processing each byte to four bytes by inserting three null bits constituting a portion of the area after each data bit of the supplementary data stream.

38. A digital broadcasting receiver comprising:
a convolutional decoder for performing convolutional decoding on a supplementary data stream, when a data stream including the supplementary data stream is received,
wherein the data stream is generated by a digital broadcasting transmitter processing a supplementary data stream according to a preset coding rate, converting a normal data stream into the data stream having an area to which the supplementary data stream is stuffed, segmenting the processed supplementary data stream into fragments and stuffing the fragments into the area in the normal stream, and
wherein the stuffing the fragments into the area comprises stuffing the fragments into a repacketized normal data stream,
wherein at least one part of the supplementary data steam is 1/4 rate converted.

39. The digital broadcasting receiver of claim 38, wherein the convolutional decoder detects the supplementary data stream from a preset position of the data stream to perform the convolutional decoding.

40. The digital broadcasting receiver of claim 38, wherein, when being coded at a 1/2 coding rate, in the supplementary data stream, one byte is processed to two bytes, and one bit of data of the supplementary data stream and one bit of the area disposed alternately.

41. The digital broadcasting receiver of claim 38, wherein, when being coded at a 1/4 coding rate, in the supplementary data stream, one byte is processed to four bytes, and one bit of data of the supplementary data stream and three bits of the area are disposed alternately.

* * * * *